United States Patent [11] 3,616,222

| [72] | Inventor | Bruce L. Dasinger<br>Scotch Plains, N.J. |
|---|---|---|
| [21] | Appl. No. | 823,099 |
| [22] | Filed | May 8, 1969 |
| [45] | Patented | Oct. 26, 1971 |
| [73] | Assignee | Esso Research and Engineering Company |

[54] PROCESS FOR SACCHARIFICATION OF CELLULOSIC AND WOODY TISSUES BY FUNGI OR ENZYMES FROM FUNGI
10 Claims, 1 Drawing Fig.

[52] U.S. Cl. .................................................. 195/31,
162/72, 162/96, 195/33, 195/82
[51] Int. Cl. ........................................................ C12d 13/00
[50] Field of Search ............................................. 195/1, 2, 4,
8, 11, 31, 32, 33, 39, 41, 82, 83, 84, 111; 99/1, 9,
14; 127/37; 162/72, 96

[56] References Cited
UNITED STATES PATENTS
3,406,089  10/1968  Yerkes ......................... 195/8 X

OTHER REFERENCES

Fuller et al., " Cellulose Decomposition of Aerobic Mesophilic Bacteria from Soil," J. of Bact., Vol. 46, pp. 291–297, 1943

*Primary Examiner*—A. Louis Monacell
*Assistant Examiner*—Gary M. Nath
*Attorneys*—Manahan and Wright and W. O. Heilman ABSTRACT: In the saccharification of cellulose, mixed cultures or enzymes derived therefrom, are used to increase the rate of converting cellulose to sugar. One culture attacks the cellulose molecule predominantly from the end yielding soluble sugars while other cultures predominantly cleave the cellulose molecules internally at random points yielding shorter fibers but not soluble sugars.

PATENTED OCT 26 1971
3,616,222
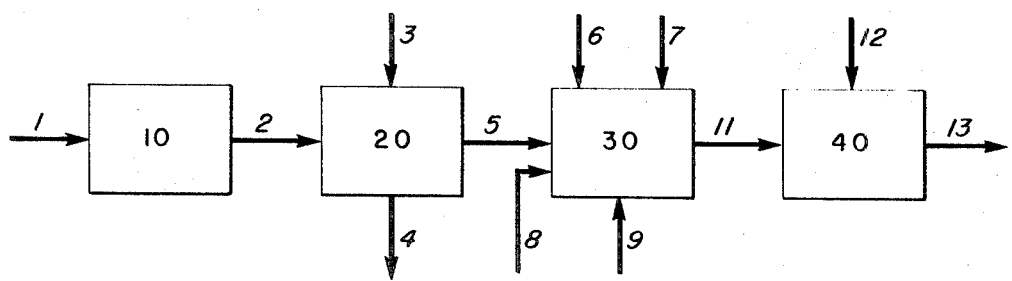
B. L. Dosinger Inventor
By W.O.T Heilman Attorney

PROCESS FOR SACCHARIFICATION OF CELLULOSIC AND WOODY TISSUES BY FUNGI OR ENZYMES FROM FUNGI

The present invention is broadly concerned with the saccharification of cellulosic and woody tissues by fungi or enzymes from fungi. The invention is particularly concerned with the use of mixed cultures, class I of which is selected from the group which attacks the cellulose molecule predominantly from the end yielding soluble sugars as products while the other culture or micro-organism is selected from a class II of organisms which predominantly attack or cleave the cellulose molecule internally at random points yielding shorter fibers but not soluble sugars. This permits the first culture to greatly increase the rate of production of soluble sugars.

It is well known that cellulose is the most widely occurring organic compound and that the natural sources vary widely in their cellulose content as, for example, from about 40 percent to 50 percent in wood to about 90 percent in cotton. It is also known that lignified plant materials are very slowly and less extensively decomposed than unlignified materials. It is further known that current methods of producing sugar from cellulosic tissues by fermentation are not economically feasible because the rates of conversion are very low. This is due to the crystalline and stranded structure of cellulose.

In accordance with the present invention, cellulosic materials are fermented with a mixed culture wherein one culture is selected from the class which attacks the cellulose molecule from the end yielding soluble sugars as products, while the other culture cleaves the cellulose molecule internally at random points yielding shorter fibers but not soluble sugars.

Typical cultures in the first category are, for example, *Stachybotrys atra, Polyporus tulipiferae, Clostridium thermocellum, Ruminococcus sp., Cellvibrio gilvus, Aspergillus niger Aspergillus fumigatus*. Typical cultures in the second category are, for example, *Trichoderma viride, Trichoderma konigii, Myrothecium verrucaria, Streptomyces sp., Irpex lacteus, Pseudomonas fluorescens var. cellulosa*, and *Trametes sanguinea*.

In carrying out the process for the conversion of cellulosic sugar, the cellulose is preferably first reduced to a fine size as, for example, approximately 80 to 120 mesh, such as 100 mesh size by mechanical means. The finely divided cellulose is then preferably treated with either a mixture of cultures in a single fermentation zone, or the cellulose may be treated in succeeding fermentation zones.

The process of the present invention may be more fully understood by reference to the drawing diagrammatically illustrating the same. Referring to the drawing, a cellulose feedstock, such as bagasse, is introduced into a shredding zone 10 by means of line 1. In this zone the cellulose is reduced or shredded, preferably to about 80 to 120 mesh. The shredding may be accomplished by any suitable means. The mixture is then preferably subjected to a pretreatment to reduce the lignin in zone 20. This may be accomplished by treatment with an acid, such as sulfuric acid or phosphoric acid or with a sodium hydroxide solution. The concentration of the acid should be in the range of from about 60 percent to 90 percent while the concentration of the sodium hydroxide solution should range from about 10 percent to 40 percent. The treatment is conducted at a relatively low temperature in the range of from about 2° C. to 10° C. for a time period of from about 2 to 10 hours. The treated cellulose is then poured into cold water, filtered and then washed free of acid and then dried at a temperature of from about 90° C. to 100° C. The thus-treated cellulose is withdrawn from zone 20 by means of line 5 and introduced into fermentation zone 30 where a culture of class I is introduced by means of line 6 and a culture of class II is introduced by means of line 7. It is to be understood that these cultures may be premixed before the introduction into zone 30 The relative amount of cultures used may be varied appreciably as, for example, from about 20 percent to 80 percent of each based upon the total cultures employed. Generally, it is preferred to use equal amounts of the respective cultures. However, under to certain conditions to initiate the fermentation it may be preferred to use 60 percent to 80 percent of a class II culture and 40 percent to 20 percent of a class I culture. As the fermentation proceeds and if additional cultures are added it is then desirable to add 60 percent to 80 percent of a class I culture and 20 percent to 40 percent of a class II culture.

The fermentation process in zone 30 is an aerobic fermentation process wherein oxygen is introduced by means of line 8. A substrate solution is introduced into fermentation zone 30 by means of line 9. A very satisfactory substrate or medium is prepared as follows:

| P1 Medium | |
| --- | --- |
| | Grams/Liter Tap Water |
| $(NH_4)_2HPO_4$ | 10 |
| $K_2HPO_4$ | 5 |
| $Na_2SO_4$ | 0.5 |

To the above is added 10 cc./liter of a salt solution A prepared as follows:

| Salt Solution A | Grams/Liter Distilled Water |
| --- | --- |
| $MgSO_4 \cdot 7H_2O$ | 40 |
| $FeSO_4 \cdot 7H_2O$ | 2 |
| $MnSO_4 \cdot 7H_2O$ | 2 |
| NaCl | 2 |

The foregoing $P_1$ medium has a pH of 7.8. A variation of the above is one in which phosphate is supplied in the form of phosphoric acid.

The pH of the culture medium is maintained in the range from about 2.5 to 9.0, preferably in the range from 4.0 to 7.0. A satisfactory pH is, for example, 5.5. The temperature is maintained in the range from 30° C. to 60° C. as, for example, from 35° C. to 45° C., preferably at about 37° C.

In general the fermentation process is an aerobic process and the growth medium comprises an aqueous mineral salt medium and excess oxygen. The fermentation process is one similar to that described in U.S. Pat. No. 3,414,477, Dec. 3, 1968 entitled, "Biosynthesis of Protein from Hydrocarbons using an Antibiotic," inventors Douros et et al., or similar to that described in U.S. Pat. No. 3,384,491, May 21, 1968 entitled, "Process for Producing High Protein Feed Supplements from Hydrocarbons," inventors Guenther et al.

It is to be understood that the foregoing described processes differ from the present process in that a hydrocarbon is not used but that cellulose is employed.

Under certain circumstances it may be desirable to conduct the fermentation process in two stages employing a first stage 30 and a second fermentation stage 40. If this operation is conducted, bacteria of class II is introduced into initial zone 30 by means of line 7 and no class I bacteria is introduced by means of line 6. The broth is withdrawn from initial zone 30 by means of line 11 and introduced into a secondary fermentation zone 40. Bacteria of class I is introduced into secondary fermentation zone 40 by means of line 12. Fermentation conditions in secondary zone 40 are maintained similar to the fermentation conditions in initial fermentation zone 30. A broth having a high sugar yield is then withdrawn from secondary fermentation zone 40 by means of line 13 and handled in any satisfactory method to recover the sugars.

As pointed out heretofore, enzymes derived from the cultures may be used to break down the cellulose. Under these conditions a substrate is not necessary. Thus, the process may be designed to produce protein by the growth of the cells consuming the sugar. However, if the desired products are sugars, then the enzymes of the cultures must be used.

Before treatment with enzymes it is particularly desirable, as mentioned, that the cellulose be treated with strong acids or bases especially if the material contains lignin. The pretreatment greatly increases the rate of sugar production by the enzymes. An alternate pretreatment of lignocellulosic materials consists of treatment with certain of the lignin decomposing fungi to destroy the lignin and make the cellulose more available to the extra cellular enzymes of the cellulose decomposing micro-organisms.

In order to further illustrate the invention the following experiments were conducted.

EXAMPLE

Culture flasks containing medium as described were inoculated with agar slants of *T. viride* and *A. fumigatus*, one slant per flask. Agar slants contained yeast extract, malt extract, and glucose. Each of the treated bagasse samples was prepared in media with and without 0.1 percent glucose and for each organism there were six flasks. The cultures were incubated for five days at 30° C. in gyratory and shaked at 120 r.p.m. The results are shown in the following table. In certain pretreatments the bagasse was treated with phosphoric acid 85 percent concentration at a temperature of 4° C. The bagasse was stirred for 4 hours and then poured into cold water. The bagasse was filtered and then washed free of acid and dried at 95° c.

In other runs the bagasse was treated with sodium hydroxide 17 percent concentration. The treatment was carried out at 5° C. for 3 hours. The bagasse was filtered, washed with water, and dried at 95° C.

TABLE I.—Pretreatment to Remove Lignin from Bagasse

| Run | Organ. | Glucose | Agent | Mg. cellulose after— 0 days | 4 days | 5 days | Cellulose amount consumed |
|---|---|---|---|---|---|---|---|
| A | Trichoderma viride | No | None | 42.2 | 35.1 | | 7.1 |
| B | Trichoderma viride | 0.1 wt. percent | do | 39.1 | 34.2 | | 4.9 |
| C | Trichoderma viride | do | H₂SO₄ | 17.5 | | 11.0 | 6.5 |
| D | Trichoderma viride | No | H₃PO₄ | 39.5 | | 23.6 | 15.9 |
| E | Trichoderma viride | Yes | Same | 31.1 | | 23.9 | 12.8 |
| F | Trichoderma viride | No | NaOH | 50.4 | | 14.0 | 36.4 |
| G | Trichoderma viride | Yes | Same | 49.9 | | 15.6 | 34.3 |
| H | Aspergillus fumigatus | No | do | 47.7 | | 16.0 | 31.7 |
| I | Aspergillus fumigatus | Yes | do | 47.3 | | 14.8 | 32.5 |

From the foregoing it is apparent that pretreatment to remove lignin is very effective and that a caustic solution, such as sodium hydroxide, is very effective in increasing the consumption of cellulose.

As pointed out heretofore, if it is desired to produce soluble sugars in the manner as described, a preferred technique is to use the enzymes from the cultures enumerated. One technique is to remove the cells from the broth and then to use this broth which contains enzymes in the treatment of cellulose such as bagasse. A preferred technique, if it is desired to maximize the production of soluble sugars is to separate the cells which have been grown on cellulose as the source of carbon, and then to break the cell walls by known techniques such as acetone extraction and segregate the enzymes therefrom. These enzymes are then contacted with additional quantities of cellulose, such as bagasse, under the fermentation conditions as heretofore set forth.

What is claimed is:

1. Process for the saccharification of cellulose which comprises conducting a fermentation process utilizing a micro-organism selected from a first class of cultures which micro-organism attacks the cellulose molecule predominantly from the yielding soluble sugars and another micro-organism selected from a second class of cultures which micro-organism predominantly attacks the cellulose molecule internally at random points without yielding soluble sugars.

2. Process as defined by claim 1 wherein said first class of cultures is selected from the class consisting of *Stachybotrys atra, Polyporus tulipiferae, Clostridium thermocellum, Ruminococcus sp., Cellvibrio gilvus, Aspergillus niger* and *Aspergillus fumigatus* and wherein said second class of cultures is selected from the class consisting of *Trichoderma viride, Trichoderma konigii, Myrothecium verrucaria, Streptomyces sp., Irpex lacteus, Pseudomonas flourescens var. cellulosa*, and *Trametes sanguinea*.

3. Fermentation process as defined by claim 1 wherein the cellulose prior to contact with said cultures is treated for the removal of lignified materials.

4. Process as defined by claim 3 wherein the cellulose is treated for the removal of lignified materials by contact with a sodium hydroxide solution.

5. Process for the production of protein using bagasse as a source of carbon which comprises shredding the bagasse in an initial zone to approximately 80 to 120 mesh, then treating the shredded bagasse in a second zone to remove lignified materials therefrom, thereafter treating the delignified bagasse in a tertiary fermentation zone by introducing into said zone a mixture of cultures wherein a first type of culture is elected from the class which predominantly attacks the cellulose molecules from the end yielding soluble sugars and wherein a second type of culture is selected from the class which predominantly attacks the cellulose molecule internally at random points without yielding soluble sugars and thereafter recovering the protein materials.

6. Process as defined by claim 5 wherein said first class of cultures, is selected from the class consisting of *Stachybotrys atra, Polyporus tulipiferae, Clostridium thermocellum, Ruminococcus sp., Cellvibrio gilvus, Aspergillus niger* and *Aspergillus fumigatus* and wherein said second class of cultures is selected from the class consisting of *Trichoderma viride, Trichoderma konigii, Myrothecium verrucaria, Streptomyces sp., Irpex lacteus, Pseudomonas flourescens var. cellulosa*, and *Trametes sanguinea*.

7. Process as defined by claim 6 wherein the fermentation zone is maintained at a pH in the range from about 4.0 to 7.0, and wherein the temperature is maintained in the range from about 35° C. to 45° C.

8. Process as defined by claim 7 wherein about 50 percent of said first type of culture and about 50 percent of said second type of culture are utilized.

9. Process as defined by claim 1 wherein the protein cells produced in the sacharrification of cellulose are separated from the fermentation broth and the broth containing enzymes is thereafter used in a subsequent fermentation process using additional quantities of cellulose as the source of carbon.

10. Process as defined by claim 9 wherein said separated protein cells are treated to recover enzymes therefrom, said enzymes thereafter being used in a subsequent fermentation process wherein additional quantities of cellulose are used as the source of carbon.